(12) United States Patent
Wang et al.

(10) Patent No.: US 10,776,918 B2
(45) Date of Patent: Sep. 15, 2020

(54) METHOD AND DEVICE FOR DETERMINING IMAGE SIMILARITY

(71) Applicant: Fujitsu Limited, Kawasaki-shi, Kanagawa (JP)

(72) Inventors: Mengjiao Wang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 15/816,315

(22) Filed: Nov. 17, 2017

(65) Prior Publication Data

US 2018/0158186 A1 Jun. 7, 2018

(30) Foreign Application Priority Data

Dec. 7, 2016 (CN) .......................... 2016 1 1115344

(51) Int. Cl.
| | |
|---|---|
| *G06T 7/00* | (2017.01) |
| *G06K 9/62* | (2006.01) |
| *G06K 9/46* | (2006.01) |
| *G06T 7/11* | (2017.01) |
| *G06T 7/136* | (2017.01) |
| *G06T 7/13* | (2017.01) |

(52) U.S. Cl.
CPC .......... *G06T 7/0016* (2013.01); *G06K 9/4642* (2013.01); *G06K 9/6212* (2013.01); *G06K 9/6215* (2013.01); *G06T 7/0014* (2013.01); *G06T 7/11* (2017.01); *G06T 7/13* (2017.01); *G06T 7/136* (2017.01); *G06K 2009/6213* (2013.01); *G06T 2207/10072* (2013.01); *G06T 2207/20021* (2013.01); *G06T 2207/30012* (2013.01); *G06T 2207/30061* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,647,139 | B1 * | 11/2003 | Kunii | G06K 9/00791 382/159 |
| 2003/0086599 | A1 * | 5/2003 | Armato, III | G06T 7/0012 382/131 |

(Continued)

FOREIGN PATENT DOCUMENTS

| | | |
|---|---|---|
| CN | 103745227 | 4/2014 |
| CN | 104239882 | 12/2014 |

*Primary Examiner* — Zhiyu Lu
(74) *Attorney, Agent, or Firm* — Staas & Halsey LLP (57) ABSTRACT

The present application relates to method and device for determining image similarity that includes: dividing a target image into multiple regions based on positions of pixels relative to a reference point in the target image, and dividing a reference image into multiple regions based on positions of pixels relative to a reference point in the reference image; determining, based on feature points in the target image and feature points in the reference image as well as the regions obtained by dividing the target image and the regions obtained by dividing the reference image, similarity between a distribution of the feature points in the target image and a distribution of the feature points in the reference image. According to the method of the present application, the similarity is described more reasonably.

16 Claims, 7 Drawing Sheets

(56) References Cited

U.S. PATENT DOCUMENTS

| | | | |
|---|---|---|---|
| 2003/0099388 A1* | 5/2003 | Doi | G06T 5/50 |
| | | | 382/131 |
| 2003/0144585 A1* | 7/2003 | Kaufman | A61B 5/0059 |
| | | | 600/407 |
| 2005/0207630 A1* | 9/2005 | Chan | A61B 6/583 |
| | | | 382/131 |
| 2008/0056572 A1* | 3/2008 | Nielsen | G06K 9/342 |
| | | | 382/173 |
| 2008/0260226 A1* | 10/2008 | Moriya | G06K 9/6201 |
| | | | 382/128 |
| 2008/0317314 A1* | 12/2008 | Schwartz | G06K 9/34 |
| | | | 382/131 |
| 2009/0204338 A1* | 8/2009 | Nielsen | G06T 7/0012 |
| | | | 702/19 |
| 2009/0324012 A1* | 12/2009 | Sun | G06T 7/251 |
| | | | 382/103 |
| 2014/0294301 A1* | 10/2014 | Nagaoka | G06T 7/155 |
| | | | 382/173 |
| 2014/0294308 A1* | 10/2014 | Nagaoka | G06K 9/3233 |
| | | | 382/199 |
| 2014/0368689 A1 | 12/2014 | Cao et al. | |
| 2015/0087954 A1* | 3/2015 | Hamada | A61B 5/7425 |
| | | | 600/407 |
| 2015/0356741 A1* | 12/2015 | Osa | G06T 7/11 |
| | | | 382/180 |
| 2016/0048972 A1* | 2/2016 | Kam | G06T 7/174 |
| | | | 382/128 |
| 2016/0117797 A1* | 4/2016 | Li | G06T 3/0081 |
| | | | 382/128 |
| 2016/0125162 A1* | 5/2016 | Takata | G06F 19/321 |
| | | | 705/2 |
| 2017/0006185 A1* | 1/2017 | Yanai | H04N 1/40 |
| 2017/0337343 A1* | 11/2017 | Kakadiaris | G06F 19/00 |
| 2018/0260954 A1* | 9/2018 | Jung | G16H 40/63 |
| 2019/0066296 A1* | 2/2019 | Lee | A61B 6/5217 |

* cited by examiner

METHOD AND DEVICE FOR DETERMINING IMAGE SIMILARITY

CROSS-REFERENCE TO RELATED APPLICATIONS

This application claims the benefit of Chinese Application No. 201611115344.2, filed Dec. 7, 2016, in the Chinese Intellectual Property Office, the disclosure of which is incorporated herein by reference.

BACKGROUND

1. Field

The present disclosure relates to the technical field of image processing, and in particular to a method and device for determining image similarity.

2. Description of the Related Art

In the field of medical applications, image retrieval may assist a physician to diagnose with a disease by retrieving similar images in a database. One of the key steps in the image retrieval is to calculate a similarity between a retrieved image (a target image) and a reference image in the database, hence to retrieve the similar images based on ranking order of similarity. Taking a diffuse lung disease as an example, a tomographic image of computed tomography is generally used for diagnosis. For this implementation example, the most common means for measuring a similarity is to measure the similarity based on the size of an overlapped portion between a diseased region in the retrieved image and a diseased region in the reference image. This method didn't consider a distribution of diseased regions, that is, information on a distance from the diseased region to a body center. The information indicates different pathogenesis and has important clinical significance.

In addition, in terms of material exploration, for reflection seismic travel-time tomography, it is also desired to calculate a similarity between a retrieved image and an image in a database based on a distribution of anomalous regions.

Therefore, it is desired method and device for calculating a similarity between a retrieved image and an image in a database based on a distribution of feature points (e.g., in a diseased region or a seismic anomalous region).

SUMMARY

Additional aspects and/or advantages will be set forth in part in the description which follows and, in part, will be apparent from the description, or may be learned by practice thereof.

An overview of the embodiments of the present disclosure is given hereinafter, to provide basic understanding regarding some aspects of the present disclosure. It should be understood that the overview is not an exhaustive overview of the present disclosure. The overview is intended neither to determine a critical part or an important part of the present disclosure, nor to limit the scope of the present disclosure. The overview is only intended to give some concepts of the present disclosure in a simplified way, which serves as a preface of more detailed description given later.

A main object of the present disclosure is to provide a method for determining image similarity, which includes: dividing a target image into multiple regions based on positions of pixels relative to a reference point in the target image, and dividing a reference image into multiple regions based on positions of pixels relative to a reference point in the reference image; determining, based on feature points in the target image and feature points in the reference image as well as the regions obtained by dividing the target image and the regions obtained by dividing the reference image, similarity between a distribution of the feature points in the target image and a distribution of the feature points in the reference image.

A device for determining image similarity is provided according to an aspect of the present disclosure. The device includes: a region dividing unit configured to divide a target image into multiple regions based on positions of pixels relative to a reference point in the target image, and divide a reference image into multiple regions based on positions of pixels relative to a reference point in the reference image; a similarity determining unit configured to determine, based on feature points in the target image and feature points in the reference image as well as the regions obtained by dividing the target image and the regions obtained by dividing the reference image, similarity between a distribution of the feature points in the target image and a distribution of the feature points in the reference image.

In addition, it is provided a computer program for realizing the method described above, according to an embodiment of the present disclosure.

Furthermore, according to an embodiment of the present disclosure, it is provided a computer program product at least in the form of a computer-readable medium, on which computer program codes for realizing the method described above are recorded.

Hereinafter, preferred embodiments of the present disclosure are described in detail in conjunction with the drawings, so that the above and other advantages of the present disclosure become more apparent.

BRIEF DESCRIPTION OF THE DRAWINGS

The above and other objects, features and advantages of the present disclosure can be better understood by referring to the following embodiments of the present disclosure described in conjunction with the drawings. In the drawings, the components are only for illustrating the principle of the present disclosure, and the same or similar technical features or parts may be indicated with the same or similar reference numerals.

DETAILED DESCRIPTION

In the following, embodiments of the present disclosure are described with reference to the drawings. Elements and features described in one drawing or one embodiment of the present disclosure may be combined with elements and features described in one or more other drawings or embodiments. It should be noted that, for clarity, the expressions and descriptions of components and processes known to those skilled in the art, which are not relevant to the present disclosure, are omitted in the drawings and the description.

In the present disclosure, it is provided a method including: dividing an image into multiple regions based on positions of pixels relative to a reference point in the image; and determining image similarity based on a distribution of feature points and information on the divided regions. Thus, the similarity is described more reasonably. A method and device for determining image similarity according to the present disclosure are mainly described below by taking a lung image as an example.

In the case where similarity between a lung tomographic image to be recognized and a sample lung tomographic image in a database is determined by using the method according to the present disclosure, a lung region is firstly extracted from a medical image, then, the lung region is divided, based on a distance from pixels in the lung region to a body center, into three regions: a region around the body center, a middle region in lung, and an inner-wall region in lung, thereby better presenting a distribution of a diseased region in the respective sub-regions. Finally, the similarity can be measured by using a bidirectional distance measurement weighted based on divided region information, thereby achieving subsequent ranking of similarities and achieving database image retrieval.

The method and device for determining image similarity according to an embodiment of the present disclosure are described in detail in conjunction with the drawings.

Figure 1:
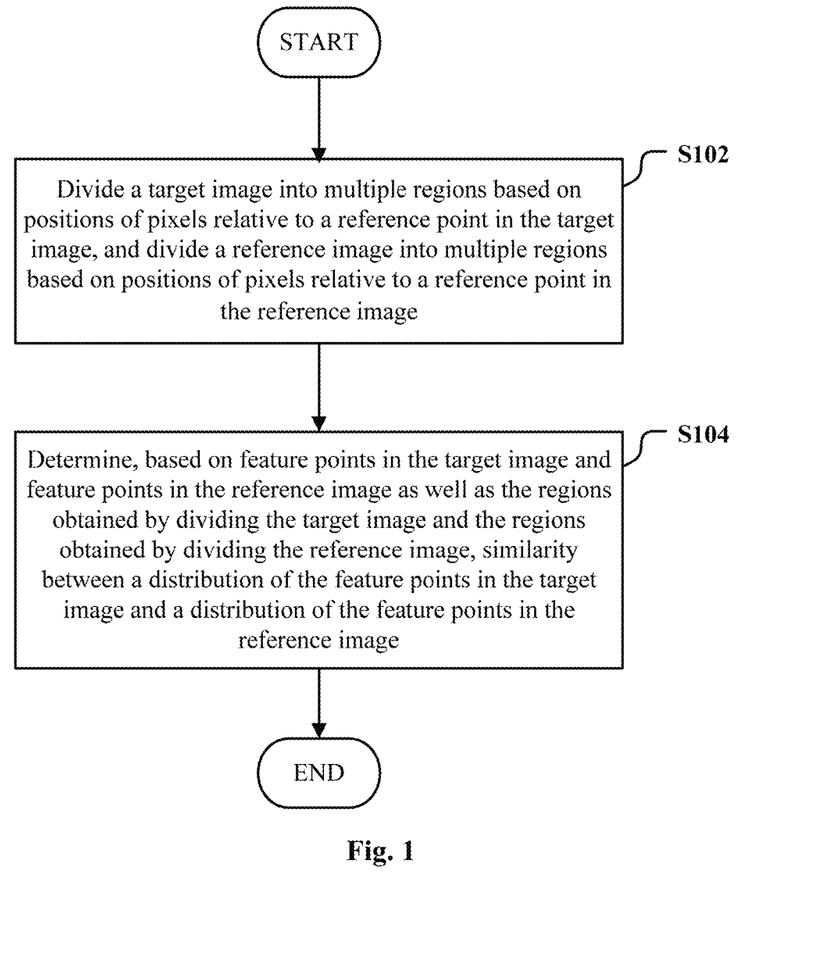
FIG. 1 illustrates a flowchart of an exemplary process of a method 100 for determining image similarity according to an embodiment of the present disclosure.

FIG. 1 is a flowchart illustrating an exemplary process of a method 100 for determining image similarity according to an embodiment of the present disclosure.

In step S102, a target image is divided into multiple regions based on positions of pixels relative to a reference point in the target image, and a reference image is divided into multiple regions based on positions of pixels relative to a reference point in the reference image.

In the following, by taking a lung tomographic image, which is to be recognized, as the target image, a division of a lung region is described in detail.

Figure 2A:
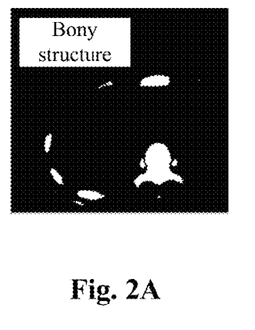
FIGS. 2A to 2D illustrate a method for determining a body center in a lung tomographic image.
Figure 2B:
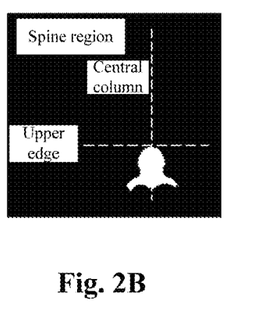
Figure 2C:
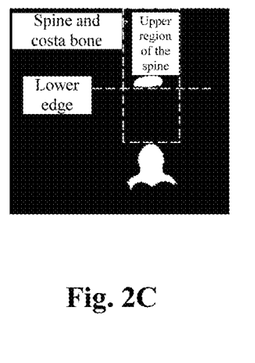
Figure 2D:
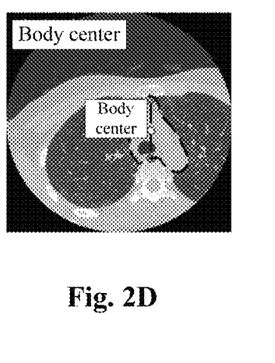

A position of a body center firstly needs to be determined, to divide the lung region. FIGS. 2A to 2D illustrate a method of determining the body center in the lung tomographic image. The body center is a center of a mediastina region of a body. The mediastina region is a region shown by a dashed line in a computed lung tomographic image illustrated in FIG. 2D. Since the shape of the mediastina region in the tomographic image is irregular, it is difficult to define the center of the mediastina region. Therefore, the body center is determined using landmarks of bony structure in the present disclosure, and the body center is determined by the following steps:

1) extracting bony structures from the tomographic image, the bony structures including a spine, a costal bone and the like, as shown in FIG. 2A;
2) extracting an isolated region with a largest area from the bony structures as a spine, as shown in FIG. 2B;
3) taking a central column of the spine as a position in a body central column direction;
4) determining the bony structure in an upper region above an upper edge of the spine, with left and right boundaries of the upper region being respective left and right boundaries of the spine, as shown in FIG. 2C;
5) determining a midpoint between a lower edge of the bony structure obtained in step 4) and the upper edge of the spine in the body central column direction as the body center point, as shown in FIG. 2D.

Figure 3:
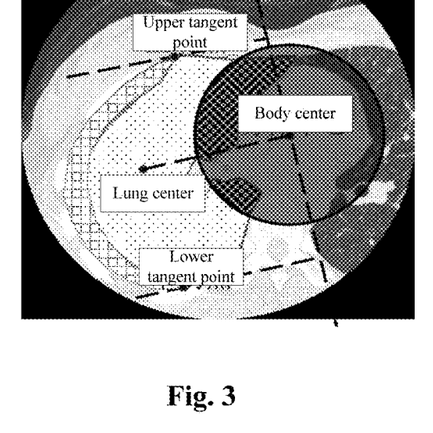
FIG. 3 illustrates a schematic diagram of three sub-regions obtained by dividing a lung.

After the body center point is determined, it is required to divide the lung region into multiple regions based on positions of the multiple regions in the lung region relative to the body center point. FIG. 3 illustrates three sub-regions obtained by dividing the lung region: a region around the body center (a region represented with a checkerboard pattern in FIG. 3), an inner-wall region in lung (a region represented with a grid pattern in FIG. 3) and a middle region in lung (a region represented with a dot pattern in FIG. 3). The three regions are determined as follows.

The region around the body center is an overlapped region between the lung region and a circular region having a predetermined radius and taking the body center point as its circle center.

The inner-wall region in lung is a region surrounded by an edge contour of the lung region (a contour between upper tangent point and lower tangent point of the lung region) and the edge contour moved inwards along a normal vector. The inner-wall region in lung is determined with the following steps: (1) creating a straight line which connects the body center point with the center of the lung region; (2) determining positions of tangent lines of the lung region parallel to the straight line, and a portion of the contour of the lung region between the upper tangent point and the lower tangent point being the edge contour of the lung region; (3) moving the edge contour towards the body center point along a normal vector of each of contour points by a certain distance (for example, 20 mm), and determining a region surrounded by the moved edge contour and the original edge contour as the inner-wall region in lung.

The middle region in lung is a region other than the region around the body center and the inner-wall region in lung, in the lung region.

In the present disclosure, the lung region is divided into the region around the body center, the inner-wall region in lung and the middle region in lung based on pixels in the lung region relative to the body center point, thereby presenting a distribution of a diseased region in the lung region more accurately.

In order to calculate the similarity between the target image and the reference image in the database, the reference image in the database needs to be divided in a way same as the way of dividing the target image.

Next, in step S104, similarity between a distribution of feature points in the target image and a distribution of feature points in the reference image is determined based on the feature points in the target image and the feature points in the reference image as well as the regions obtained by dividing the target image and the regions obtained by dividing the reference image.

Figure 4:
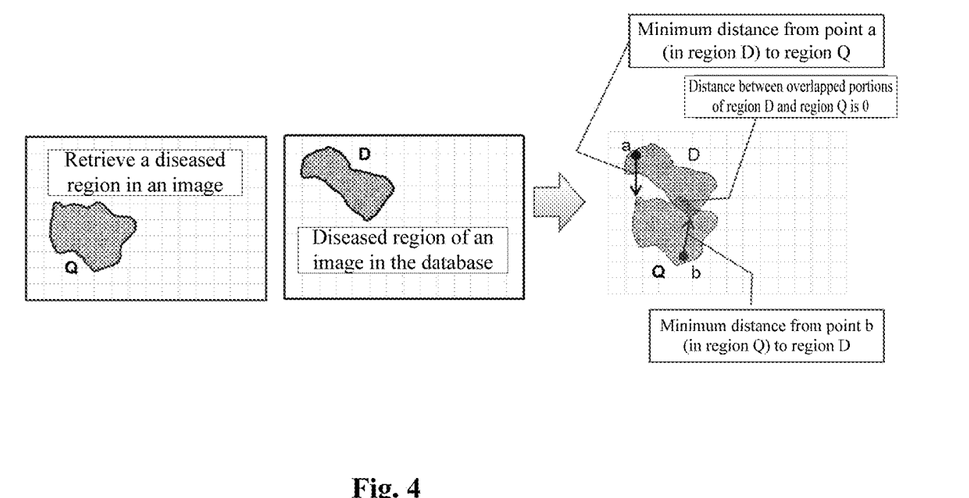
FIG. 4 illustrates a method for calculating similarity between a lung tomographic image to be recognized and a lung tomographic image in a database.

FIG. 4 illustrates a method for calculating the similarity between a lung tomographic image to be recognized (i.e., the target image) and a lung tomographic image in the database (i.e., the reference image). Here, it is assumed that a diseased region of lung in the lung tomographic image to be recognized and a diseased region of lung in the lung tomographic image in the database are both given. In this case, the similarity between the target image and the reference image is calculated with the following steps.

First, each of the target image and the reference image is divided into three regions based on the method for dividing the lung region described above. In this way, a labeled diseased region in each of the target image and the reference image is distributed into the three regions.

Next, for each pixel of the diseased region in the target image, distances from a pixel of the diseased region in the target image to pixels of the diseased region in the reference image are calculated to determine a minimum distance from the calculated distances.

For example, as shown in FIG. 4, for a pixel b of the diseased region Q in the target image, distances from the pixel b to the respective pixels of the diseased region D in the reference image are calculated to determine a minimum distance from the calculated distances, that is, a minimum distance from the pixel b to the region D is calculated.

In a case that there is an overlapped region between the region Q and the region D, the distance between the overlapped portion in the region Q and the overlapped portion in the region D is 0.

A minimum distance from each pixel of the diseased region in the reference image to the pixels of the diseased region in the target image is calculated in a way same as the above.

For example, as shown in FIG. 4, for a pixel a in the diseased region D in the reference image, distances from the pixel a to the respective pixels of the diseased region Q in the target image are calculated to determine a minimum distance from the calculated distances, that is, a minimum distance from the pixel a to the region Q is calculated.

Next, in the case that the target image and the reference image are considered in a same coordinate system, the minimum distances described above are weighted.

If a first region (the first region is a region in the target image in which a pixel serving as one end of the minimum distance is located) and a second region (the second region is a region in the reference image in which a feature point serving as other end of the minimum distance is located) are same regions respectively in the target image and the reference image (that is, both the first region and the second region are regions around the body center, inner-wall regions in lung or middle regions in lung respectively in the target image and the reference image), the weight is set as 1; if the first region and the second region are adjacent regions respectively in the target image and the reference image, the weight is set as 2, and so forth. It is to be understood by those skilled in the art that the weight is not limited to the above values as long as it satisfies the following conditions: the weight in a case that the two pixels are located respectively in the same regions is set less than the weight in a case that the two pixels are located respectively in adjacent regions; the weight value is larger when the first region in the target image is far from the second region in the reference image.

Finally, all of the weighted distances are summed to obtain a final numerical value of the similarity.

The finally-obtained numerical value of the similarity represents a distance between the target image and the reference image, and the similarity between the target image and the reference image is reduced as the distance is increased. In the above, it is described a similarity measuring method in which the bidirectional distance measurement weighted based on information on lung divided region is used, thereby achieving a smaller distance between corresponding regions and a larger distance between non-corresponding regions. In this case, the similarity is described more reasonably.

In an example, the lung region is recognized before the target image is divided.

The recognition of the lung region is described below with reference to FIGS. 5A-5E and FIGS. 6A-6E. In the present disclosure, the lung region is divided into a normal region and a diseased region, and the diseased region is divided into a diffuse diseased region (a diseased region without an obvious boundary, as shown in FIGS. 5A-5E) and a solid diseased region (a diseased region with an obvious boundary, as shown in FIGS. 6A-6E).

Figure 5A:
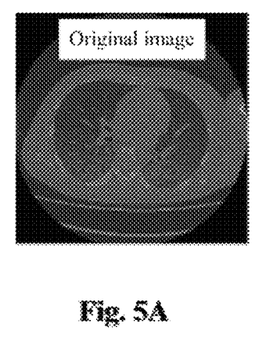
FIGS. 5A to 5E are schematic diagrams illustrating a process of recognizing a diffuse diseased region of a lung.
Figure 5B:
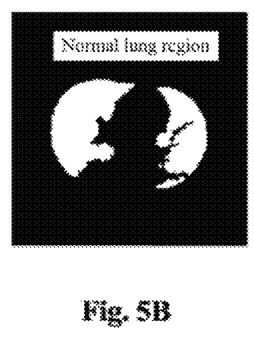
Figure 5C:
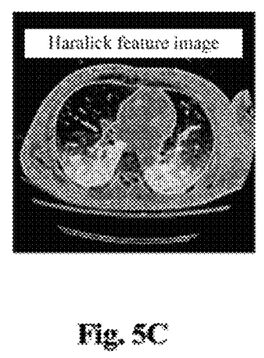
Figure 5D:
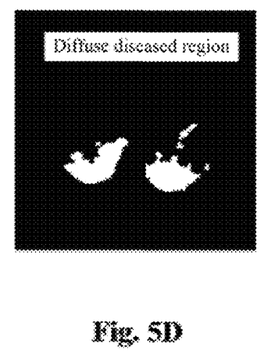
Figure 5E:
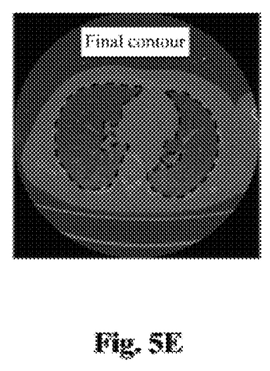
Figure 6A:
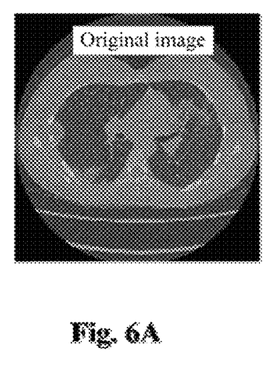
FIGS. 6A to 6E are schematic diagrams illustrating a process of recognizing a solid diseased region of a lung.
Figure 6B:
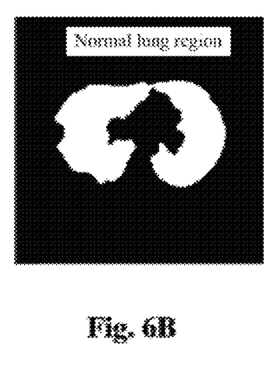
Figure 6C:
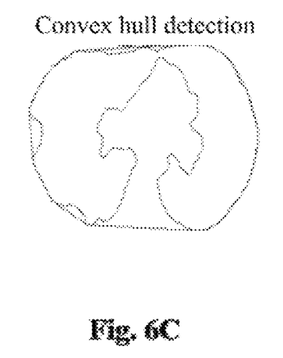
Figure 6D:
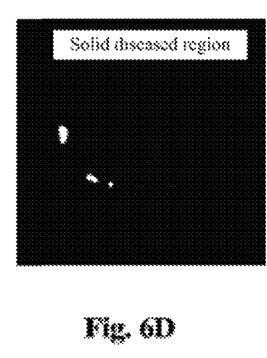
Figure 6E:
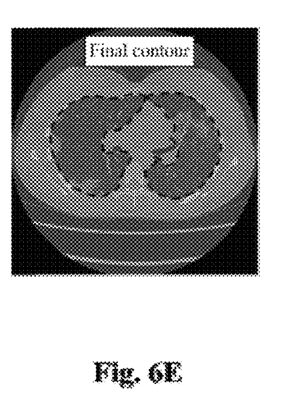

In the computerized tomographic image, the normal lung region has a lower image grayscale value. Thus, the normal lung region (as shown in FIGS. 5B and 6B) can be recognized using a threshold segmentation method, and then the contour of the extracted region is made smoother with a morphological close and open operation.

Hereinafter, it is described how to recognize the diffuse diseased region and the solid diseased region.

In order to recognize the diffuse diseased region, firstly, a sum of entropy, which is one of the Haralick features, is calculate for the entire image, so that the diffuse diseased region has higher pixel values than other regions; and then the diffuse diseased region is extracted by setting a threshold.

The solid diseased region generally appears at the boundary of the contour of the lung. Thus, the solid diseased region is recognized by calculating a convex hull in the present disclosure. Firstly, the convex hull is calculated for the entire normal region. Then, an image of the normal region is subtracted from the convex hull image, and a maximum independent region between the two lung regions is removed therefrom so as to obtain the final solid diseased region.

Finally, the normal region, the diffuse diseased region and the solid diseased region are superimposed to obtain a final lung region.

In the present disclosure, recognizing the lung region includes recognizing the normal region and recognizing the diseased region. Recognizing the diseased region includes recognizing the diffuse diseased region and recognizing the solid diseased region. Finally, an entire lung region can be obtained by superimposing the normal region with the diseased region.

An exemplary configuration of a device 700 for determining image similarity according to an embodiment of the present disclosure is described below with reference to FIG. 7.

Figure 7:
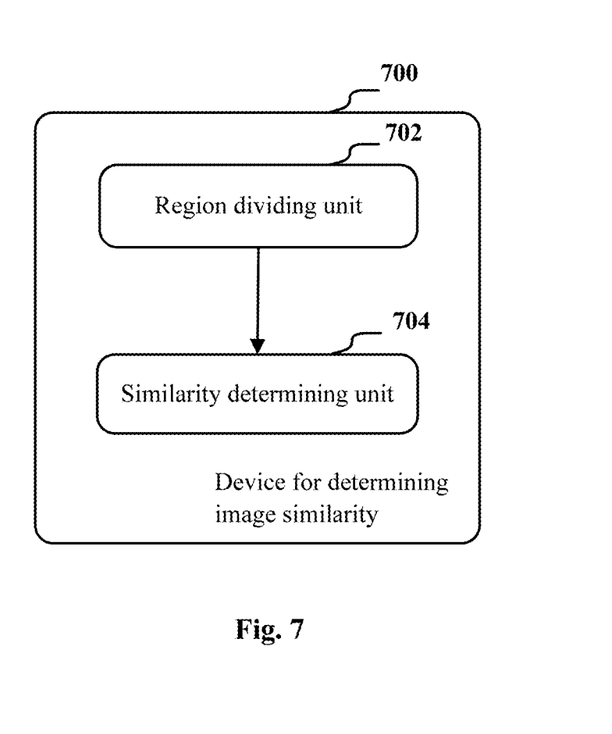
FIG. 7 is a block diagram illustrating an exemplary configuration of a device 700 for determining image similarity according to an embodiment of the present disclosure.

As shown in FIG. 7, the device 700 for determining the image similarity includes a region dividing unit 702 and a similarity determining unit 704.

The region dividing unit 702 is configured to divide a target image into multiple regions based on positions of pixels relative to a reference point in the target image, and divide a reference image into multiple regions based on positions of pixels relative to a reference point in the reference image.

The similarity determining unit 704 is configured to determine, based on feature points in the target image and feature points in the reference image as well as the regions obtained by dividing the target image and the regions obtained by dividing the reference image, similarity between a distribution of the feature points in the target image and a distribution of the feature points in the reference image.

The similarity determining unit 704 is further configured to: calculate distances from each feature point in the target image to the respective feature points in the reference image and determine a minimum distance from the calculated distances as a first minimum distance; calculate distances from each feature point in the reference image to the respective feature points in the target image and determine a minimum distance from the calculated distances as a second minimum distance, where the target image and the reference image are in a same coordinate system; weighted sum the first minimum distance and the second minimum distance; and determine the similarity between the distribution of the feature points in the target image and the distribution of the feature points in the reference image based on a weighted summing result.

In an example, the device 700 for determining the image similarity further includes: a weight value determining unit (not shown in the drawings) configured to, for each minimum distance of the first minimum distance and second minimum distance, determine a weight value for weighting based on a first region and a second region, wherein the first region is a region in the target image in which a feature point serving as one end of the minimum distance is located, and the second region is a region in the reference image in which a feature point serving as other end of the minimum distance is located; where, in a case that the first region and the second region are same regions respectively in the target image and the reference image, the weight value is set as a first weight value; in a case that the first region and the second region are adjacent regions respectively in the target image and the reference image, the weight value is set as a second weight value; and in a case that the first region and the second region are neither the same regions nor adjacent regions respectively in the target image and the reference image, the weight value is set as another weight value other than the first weight value and the second weight value; where, the first weight value is smaller than the second value, and the weight value is larger when the first region in the target image is far from the second region in the reference image.

The target image is a lung tomographic image to be recognized, the reference image is a sample lung tomographic image in a database, the feature points are pixels in a diseased region in the lung tomographic image, and the reference point is a body center point.

In an example, the region dividing unit 702 is further configured to determine the body center point based on the bony structure of the body with steps of: extracting bony structures from the lung tomographic image; determining an isolated region with a largest area as a spine; determining a central column of the spine and an upper edge of the spine; determining the bony structure within an upper region above the upper edge of the spine, with left and right boundaries of the upper region being respective left and right boundaries of the spine; determining a lower edge of the bony structure determined in the upper region; and determining a midpoint of the central column between the upper edge and the lower edge as the body center point.

In an example, the region dividing unit 702 is further configured to: divide the lung tomographic image into a region around the body center, an inner-wall region in lung and a middle region in lung based on positions of pixels in the lung tomographic image relative to the body center point.

In an example, the region dividing unit 702 is further configured to divide the lung tomographic image with steps of: determining an overlapped region between a circular region and a lung region as the region around the body center, with the circular region having a predetermined radius and taking the body center point as a circle center; determining the inner-wall region in lung with steps of: creating a straight line for connecting the body center point with a center of the lung region; determining an upper tangent line and a lower tangent line which are parallel to the created straight line and tangent to a contour of the lung region, and determining an edge contour of the lung region between an upper tangent point corresponding to the upper tangent line and a lower tangent point corresponding to the lower tangent line; and moving the edge contour towards the body center point along normal vectors of contour points by a predetermined distance, and determining a region surrounded by the moved edge contour and the original edge contour as the inner-wall region in lung; and obtaining the middle region in lung by subtracting the region around the body center and the inner-wall region in lung from the lung region.

In an example, the device 700 for determining the image similarity further includes a lung region recognizing unit (not shown in the drawings) which is configured to: extract an original region of normal lung from the lung tomographic image; extract a diffuse diseased region and a solid diseased region respectively; obtain a lung region by combining the original region of normal lung, the diffuse diseased region and the solid diseased region; and the lung region is used as the target image for region dividing.

The lung region recognizing unit is further configured to extract the normal lung region with a threshold segmentation method.

The lung region recognizing unit is further configured to recognize the solid diseased region by calculating a convex hull.

The details of the operations and functions of the respective parts of the device 700 for determining the image similarity can be described with reference to the embodiments of the method for determining the image similarity described in conjunction with FIG. 1 to FIG. 6, which will not be described in detail herein.

It should be noted that structure related to the device and the units of the device shown in FIG. 7 is merely exemplary and that those skilled in the art may modify the structural block diagram shown in FIG. 7 as desired.

Although the basic principle of the present disclosure is described above in conjunction with specific embodiments, it is to be understood by those skilled in the art that all or any of the steps or components of the method and the device according to the present disclosure may be implemented in any computing device (including a processor, a storage medium, etc.) or a network of the computing device in the form of hardware, firmware, software, or a combination thereof, which can be achieved by those skilled in the art upon reading the description of the present disclosure using their basic programming skills.

Therefore, the object of the present disclosure can also be achieved by running a program or a set of programs on any computing device. The computing device may be a known general-purpose device. Accordingly, the object of the present disclosure may also be achieved merely by providing a program product containing program codes for implementing the method or the device. That is, such program product also constitutes the present disclosure, and a storage medium storing the program product also constitutes the present disclosure. Apparently, the storage medium may be any known storage medium or any storage medium developed in the future.

Figure 8:
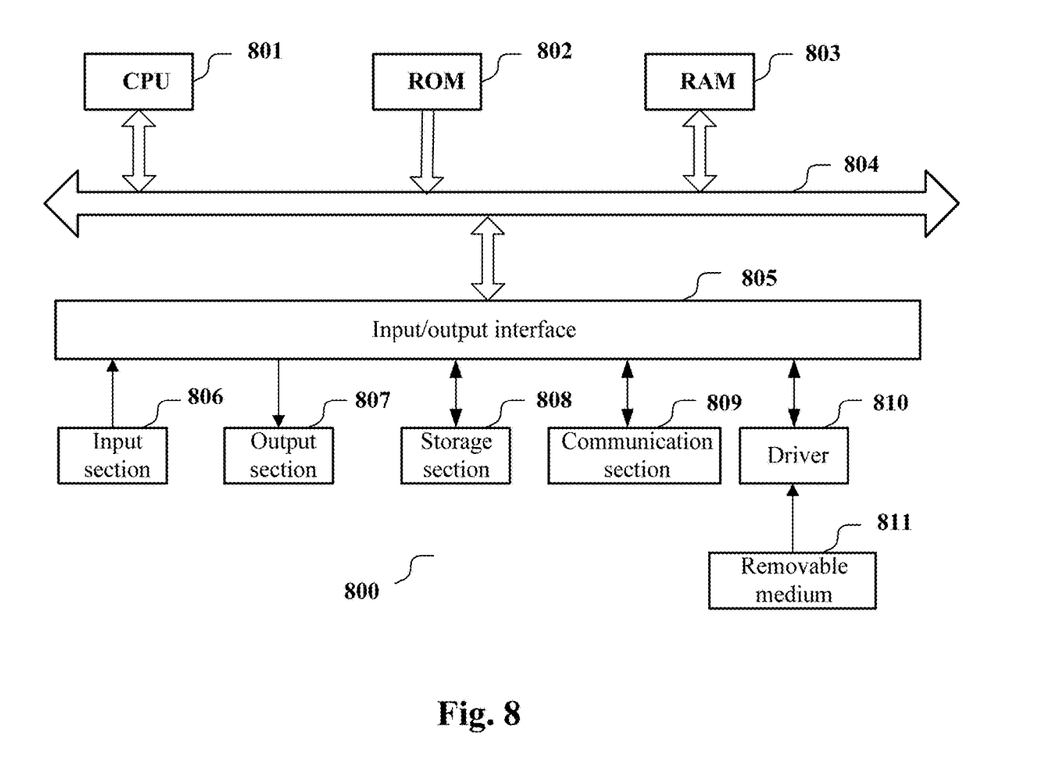
FIG. 8 is a diagram illustrating an exemplary structure of a computing device which can be used to implement method and device for determining image similarity according to the present disclosure.

In the case where the embodiment of the present disclosure is implemented by software and/or firmware, programs constituting the software are installed from a storage medium or a network to a computer having a dedicated hardware structure, such as a general-purpose computer 800 shown in FIG. 8. The computer can perform various functions when being installed with various programs.

In FIG. 8, a central processing unit (CPU) 801 performs various processing in response to a program stored in a read only memory (ROM) 802 or a program loaded from a storage section 808 onto a random access memory (RAM) 803. Data required by the CPU 801 to perform various processing or the like is also stored in the RAM 803 as necessary. The CPU 801, the ROM 802, and the RAM 803 are linked to one another via a bus 804. An input/output interface 805 is also linked to the bus 804.

The following components are linked to the input/output interface 805: an input section 806 (including a keyboard, a mouse, etc.), an output section 807 (including a display (such as a cathode ray tube (CRT) and a liquid crystal display (LCD)), a speaker, etc.), a storage section 808 (including a hard disk, etc.), a communication section 809 (including a network interface card (such as a LAN card), a modem, etc.). The communication section 809 performs communication processing via a network such as the Internet. The driver 810 may also be linked to the input/output interface 805 as necessary. A removable medium 811, such as a magnetic disk, an optical disk, a magneto-optical disk and a semiconductor memory, is mounted on the driver 810 as necessary so that a computer program read from the removable medium 811 is loaded into the storage section 808 as necessary.

In the case where the above-described processing are achieved with software, programs constituting the software are installed from a network such as the internet or a storage medium such as the removable medium 811.

It will be understood by those skilled in the art that the storage medium is not limited to the removable medium 811 shown in FIG. 8 in which a program is stored and distributed separately from the device to provide a program to a user. Examples of the removable medium 811 include a magnetic disk (including a floppy disk (registered trademark)), an optical disk (including a compact disk read only memory (CD-ROM) and a digital versatile disk (DVD)), a magneto-optical disk (including a mini-disc (MD) (registered trademark)) and a semiconductor memory. Alternatively, the storage medium may be the ROM 802, a hard disk included in the storage section 808 or the like, in which programs are stored and distributed to the user along with the device containing them.

A program product storing machine-readable instruction codes is further provided according to the present disclosure. When being read and executed by a machine, the instruction codes can perform the above-described method according to the embodiments of the present disclosure.

Accordingly, a storage medium for carrying the above program product which stores the instruction codes readable by the machine is also included in the present disclosure. Storage medium includes but is not limited to a floppy disk, an optical disk, a magneto-optical disk, a memory card, a memory stick and the like.

It will be understood by those skilled in the art that the embodiments illustrated herein are exemplary and the present disclosure is not limited thereto.

In the present specification, the expressions "first", "second" and "n-th" are intended to distinguish the described features literally in order to describe the present disclosure clearly. Therefore, they should not be regarded as having any restrictive meaning.

As an example, the steps of the above method and the constituent modules and/or units of the above device may be implemented as software, firmware, hardware or a combination thereof and may serve as a part of a corresponding device. The specific means or manner through which the various constituent modules and units of the device described above may be configured by software, firmware, hardware, or a combination thereof is well known to those skilled in the art and is not described here.

As an example, in the case where the present disclosure is realized by software or firmware, a program constituting the software may be installed from a storage medium or a network to a computer having a dedicated hardware structure (for example, the general-purpose computer 800 shown in FIG. 8). The computer can perform various functions when being installed with various programs.

In the above description of specific embodiments of the present disclosure, the features described and/or illustrated for one embodiment may be used in one or more other embodiments in the same or similar manner, combined with features in other embodiments, or in place of features in other embodiments.

It should be emphasized that the term "comprising/including" as used herein refers to the presence of a feature, an element, a step or a component, but does not exclude the presence or addition of one or more other features, elements, steps or components.

In addition, the method of the present disclosure is not limited to be executed in the chronological order described in the specification, and may also be executed sequentially, in parallel or independently. Therefore, the order of execution of the method described in the present specification does not limit the technical scope of the present disclosure.

The present disclosure and its advantages are described above. However, it should be understood that various changes, substitutions and alterations may be made to the present disclosure, without departing from the spirit and scope of the present disclosure defined in the appended claims. Moreover, the scope of the present disclosure is not limited to the specific embodiments of the processes, apparatuses, means, methods and steps described in the specification. It can be understood by those ordinary skilled in the art from the disclosure that, the process, device, means, method and step that exist or to be developed in the future and perform functions substantially the same and obtain substantially the same result as the corresponding embodiment herein can be used. Accordingly, the appended claims are intended to include such processes, apparatuses, means, methods, or steps within their scope.

Based on the above description, it can be seen that at least the following technical solutions are disclosed:

(1) A method for determining image similarity, including:

dividing a target image into multiple regions based on positions of pixels relative to a reference point in the target image and dividing a reference image into multiple regions based on positions of pixels relative to a reference point in the reference image;

determining, based on feature points in the target image and feature points in the reference image as well as the regions obtained by dividing the target image and the regions obtained by dividing the reference image, similarity between a distribution of the feature points in the target image and a distribution of the feature points in the reference image.

(2) The method according to note (1), where the determining, based on the feature points in the target image and the feature points in the reference image as well as the regions obtained by dividing the target image and the regions obtained by dividing the reference image, the similarity between the distribution of the feature points in the target image and the distribution of the feature points in the reference image includes:

calculating distances from each of the feature points in the target image to the respective feature points in the reference image and determining a minimum distance from the calculated distances as a first minimum distance;

calculating distances from each of the feature points in the reference image to respective feature points in the target image and determining a minimum distance from the calculated distance as a second minimum distance;

weighted summing the first minimum distance and the second minimum distance; and determining the similarity between the distribution of the feature points in the target image and the distribution of the feature points in the reference image based on a weighted summing result;

where the target image and the reference image are in a same coordinate system.

(3) The method according to note (2), where, for each minimum distance of the first minimum distance and second minimum distance, determine a weight value for weighting based on a first region and a second region, wherein the first region is a region in the target image in which a feature point serving as one end of the minimum distance is located, and the second region is a region in the reference image in which a feature point serving as other end of the minimum distance is located;

where, in a case that the first region and the second region are same regions respectively in the target image and the reference image, the weight value is set as a first weight value;

in a case that the first region and the second region are adjacent regions respectively in the target image and the reference image, the weight value is set as a second weight value; and in a case that the first region and the second region are neither the same regions nor adjacent regions respectively in the target image and the reference image, the weight value is set as another weight value other than the first weight value and the second weight value;

where, the first weight value is smaller than the second value, and the weight value is larger when the first region in the target image is far from the second region in the reference image.

(4) The method according to note (1), where the target image is a lung tomographic image to be recognized, the reference image is a sample lung tomographic image in a database, the feature points are pixels in a diseased region in the lung tomographic image, and the reference point is a body center point.

(5) The method according to note (4), where the body center point is determined based on body bony structure with steps of:

extracting the bony structures from the lung tomographic image;

determining an isolated region with a largest area as a spine;

determining a central column of the spine and an upper edge of the spine;

determining the bony structure within an upper region above the upper edge of the spine, with left and right boundaries of the upper region being respective left and right boundaries of the spine;

determining a lower edge of the bony structure determined in the upper region; and determining a midpoint of the central column between the upper edge and the lower edge as the body center point.

(6) The method according to note (5), where the dividing the target image into the multiple regions based on the positions of the pixels relative to the reference point in the target image includes: dividing the lung tomographic image into a region around the body center, an inner-wall region in lung and a middle region in lung based on positions of pixels in the lung tomographic image relative to the body center point.

(7) The method according to note (6), where the lung tomographic image is divided with steps of:

determining an overlapped region between a circular region and a lung region as the region around the body center, with the circular region having a predetermined radius and taking the body center point as a circle center;

determining the inner-wall region in lung with steps of:

creating a straight line for connecting the body center point with a center of the lung region;

determining an upper tangent line and a lower tangent line which are parallel to the created straight line and tangent to a contour of the lung region, and determining an edge contour of the lung region between an upper tangent point corresponding to the upper tangent line and a lower tangent point corresponding to the lower tangent line; and moving the edge contour towards the body center point along normal vectors of contour points by a predetermined distance, and determining a region surrounded by the moved edge contour and the original edge contour as the inner-wall region in lung; and obtaining the middle region in lung by subtracting the region around the body center and the inner-wall region in lung from the lung region.

(8) The method according to any one of notes (4) to (7), before dividing the target image into of the multiple regions, the method further including: recognizing a lung region, where the recognizing a lung region includes:

extracting a normal lung region from the lung tomographic image;

extracting a diffuse diseased region and a solid diseased region;

obtaining the lung region by combining the normal lung region, the diffuse diseased region and the solid diseased region; and dividing the lung region serving as the target image.

(9) The method according to note (8), where the normal lung region is extracted with a threshold segmentation method.

(10) The method according to note (8), where the solid diseased region is recognized by calculating a convex hull.

(11) A device for determining image similarity, including:

a region dividing unit, configured to divide a target image into multiple regions based on positions of pixels relative to a reference point in the target image, and divide a reference image into multiple regions based on positions of pixels relative to a reference point in the reference image; and a similarity determining unit, configured to determine, based on feature points in the target image and feature points in the reference image as well as the regions obtained by dividing the target image and the regions obtained by dividing the reference image, similarity between a distribution of the feature points in the target image and a distribution of the feature points in the reference image.

(12) The device according to note (11), where the similarity determining unit is further configured to:

calculate distances from each of the feature points in the target image to the respective feature points in the reference image and determine a minimum distance from the calculated distances as a first minimum distance;

calculate distances from each of the feature points in the reference image to respective feature points in the target image and determine a minimum distance from the calculated distance as a second minimum distance;

weighted summing the first minimum distance and the second minimum distance; and determine the similarity between the distribution of the feature points in the target image and the distribution of the feature points in the reference image based on a weighted summing result;

where the target image and the reference image are in a same coordinate system.

(13) The device according to note (11), further including:
a weight value determining unit configured to:

for each minimum distance of the first minimum distance and second minimum distance, determine a weight value for weighting based on a first region and a second region, wherein the first region is a region in the target image in which a feature point serving as one end of the minimum distance is located, and the second region is a region in the reference image in which a feature point serving as other end of the minimum distance is located;

where, in a case that the first region and the second region are same regions respectively in the target image and the reference image, the weight value is set as a first weight value;

in a case that the first region and the second region are adjacent regions respectively in the target image and the reference image, the weight value is set as a second weight value; and in a case that the first region and the second region are neither the same regions nor adjacent regions respectively in the target image and the reference image, the weight value is set as another weight value other than the first weight value and the second weight value;

where, the first weight value is smaller than the second value, and the weight value is larger when the first region in the target image is far from the second region in the reference image.

(14) The device according to note (11), where the target image is a lung tomographic image to be recognized, the reference image is a sample lung tomographic image in a database, the feature points are pixels in a diseased region in the lung tomographic image, and the reference point is a body center point.

(15) The device according to note (14), where the region dividing unit is further configured to determine the body center point based on body bony structures with steps of:

extracting the bony structures from the lung tomographic image;

determining an isolated region with a largest area as a spine;

determining a central column of the spine and an upper edge of the spine;

determining the bony structure within an upper region above the upper edge of the spine, with left and right boundaries of the upper region being respective left and right boundaries of the spine;

determining a lower edge of the bony structure determined in the upper region; and determining a midpoint of the central column between the upper edge and the lower edge as the body center point.

(16) The device according to note (15), where the region dividing unit is further configured to divide the lung tomographic image into a region around the body center, an inner-wall region in lung and a middle region in lung based on positions of pixels in the lung tomographic image relative to the body center point.

(17) The device according to note (16), where the region dividing unit is further configured to divide the lung tomographic image with steps of:

determining an overlapped region between a circular region and a lung region as the region around the body center, with the circular region having a predetermined radius and taking the body center point as a circle center;

determining the inner-wall region in lung with steps of:

creating a straight line for connecting the body center point with a center of the lung region;

determining an upper tangent line and a lower tangent line which are parallel to the created straight line and tangent to a contour of the lung region, and determining an edge contour of the lung region between an upper tangent point corresponding to the upper tangent line and a lower tangent point corresponding to the lower tangent line; and moving the edge contour towards the body center point along normal vectors of contour points by a predetermined distance, and determining a region surrounded by the moved edge contour and the original edge contour as the inner-wall region in lung; and obtaining the middle region in lung by subtracting the region around the body center and the inner-wall region in lung from the lung region.

(18) The device according to any one of notes (14) to (17), further including a lung region recognizing unit configured to:

extract a normal lung region from the lung tomographic image;

extracting a diffuse diseased region and a solid diseased region;

obtaining a lung region by combining the normal lung region, the diffuse diseased region and the solid diseased region; and using the lung region as the target image for region dividing.

(19) The device according to note (18), where the lung region recognizing unit is further configured to: extract the normal lung region with a threshold segmentation method.

(20) The device according to note (18), where the lung region recognizing unit is further configured to: recognize the solid diseased region by calculating a convex hull.

(21) A method for determining image similarity, comprising:

dividing a target image into a plurality of anomalous regions relative to a target image reference point in the target image, and dividing a reference image into a plurality of anomalous regions relative to a reference image reference point in the reference image;

determining, based on positions of the regions of the target image and positions of the regions of the reference image, a similarity between a target image distribution of the regions in the target image and a reference image distribution of the regions in the reference image.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A method for determining image similarity, comprising:
   dividing a target image into a plurality of regions based on positions of pixels relative to one target image reference point in the target image, and dividing a reference image into a plurality of regions based on positions of pixels relative to one reference image reference point in the reference image,
   the target image and the reference image being in a same coordinate system; and
   determining, based on feature points in the target image and feature points in the reference image as well as the regions obtained by dividing the target image and the regions obtained by dividing the reference image, a similarity between a target image distribution of the feature points in the target image and a reference image distribution of the feature points in the reference image,
   wherein the determining the similarity includes,
      calculating distances from each of the feature points in the target image to respective feature points in the reference image and determining a minimum distance from the calculated distances as a first minimum distance;
      calculating distances from each of the feature points in the reference image to respective feature points in the target image and determining a minimum distance from the calculated distance as a second minimum distance;
      weighted summing the first minimum distance and the second minimum distance; and
      determining the similarity between the distribution of the feature points in the target image and the distribution of the feature points in the reference image based on a result of the weighted summing,
   wherein, for each minimum distance of the first minimum distance and second minimum distance, a weight value for weighting based on a first region and a second region are determined, wherein the first region is a target image region in the target image in which a feature point serving as one end of the each minimum distance is located, and the second region is a reference image region in the reference image in which a feature point serving as other end of the each minimum distance is located;
   wherein,
      when the first region and the second region are a same regions respectively in the target image and the reference image, the weight value is set as a first weight value;
      when the first region and the second region are adjacent regions respectively in the target image and the reference image, the weight value is set as a second weight value; and
      when the first region and the second region are neither the same regions nor adjacent regions respectively in the target image and the reference image, the weight value is set as another weight value other than the first weight value and the second weight value;
      wherein the first weight value is smaller than the second weight value, and the weight value is larger when the first region in the target image is far from the second region in the reference image.

2. The method according to claim 1, wherein the target image is a target lung tomographic image to be recognized, the reference image is a sample lung tomographic image in a database, the feature points are pixels in a diseased region in the lung tomographic image, and the reference point is a body center point.

3. The method according to claim 2, wherein the body center point is determined based on body bony structures by:
   extracting the bony structures from the target lung tomographic image;
   determining an isolated region with a largest area as a spine;
   determining a central column of the spine and an upper edge of the spine;
   determining the bony structure within an upper region above the upper edge of the spine, with left and right boundaries of the upper region being respective left and right boundaries of the spine;
   determining a lower edge of the bony structure determined in the upper region; and
   determining a midpoint of the central column between the upper edge and the lower edge as the body center point.

4. The method according to claim 3, wherein the dividing the target image into the plurality of regions based on the positions of the pixels relative to the reference point in the target image comprises: dividing the target lung tomographic image into a region around the body center, an inner-wall region in lung and a middle region in lung based on positions of pixels in the target lung tomographic image relative to the body center point.

5. The method according to claim 4, wherein the target lung tomographic image is divided by:
   determining an overlapped region between a circular region and a lung region as the region around the body center, with the circular region having a predetermined radius and using the body center point as a circle center;
   determining the inner-wall region in lung by:
      creating a straight line for connecting the body center point with a center of the lung region;
      determining an upper tangent line and a lower tangent line which are parallel to the straight line and tangent to a contour of the lung region, and determining an edge contour of the lung region between an upper tangent point corresponding to the upper tangent line and a lower tangent point corresponding to the lower tangent line; and
      moving the edge contour towards the body center point along normal vectors of contour points by a predetermined distance, and determining a region surrounded by a moved edge contour and an original edge contour as the inner-wall region in lung; and
   obtaining the middle region in lung by subtracting the region around the body center and the inner-wall region in the lung from the lung region.

6. The method according to claim 2, before dividing the target image into the plurality of regions, the method further comprising: recognizing a target lung region, wherein the recognizing the target lung region comprises:
   extracting a normal lung region from the target lung tomographic image;
   extracting a diffuse diseased region and a solid diseased region;
   obtaining the lung region by combining the normal lung region, the diffuse diseased region and the solid diseased region; and
   using the target lung region as the target image for region dividing.

7. The method according to claim 6, wherein the normal lung region is extracted with a threshold segmentation method.

8. The method according to claim 6, wherein the solid diseased region is recognized by calculating a convex hull.

9. A device to determine image similarity, comprising:
a processor configured to couple to a memory and to implement,
a region divider, configured to divide a target image into a plurality of regions based on positions of pixels relative to one target image reference point in the target image, and divide a reference image into a plurality of regions based on positions of pixels relative to one reference image reference point in the reference image,
the target image and the reference image being in a same coordinate system; and
a similarity determiner, configured to determine, based on feature points in the target image and feature points in the reference image as well as the regions obtained by dividing the target image and the regions obtained by dividing the reference image, a similarity between a target image distribution of the feature points in the target image and a reference image distribution of the feature points in the reference image,
wherein the similarity determiner is to,
calculate distances from each of the feature points in the target image to respective feature points in the reference image and determine a minimum distance from the calculated distances as a first minimum distance;
calculate distances from each of the feature points in the reference image to respective feature points in the target image and determine a minimum distance from the calculated distance as a second minimum distance;
weighted summing the first minimum distance and the second minimum distance; and
determine the similarity between the distribution of the feature points in the target image and the distribution of the feature points in the reference image based on a result of the weighted summing,
a weight value determiner configured to,
for each minimum distance of the first minimum distance and second minimum distance, determine a weight value for weighting based on a first region and a second region, wherein the first region is a target image region in the target image in which a feature point serving as one end of the minimum distance is located, and the second region is a reference image region in the reference image in which a feature point serving as other end of the each minimum distance is located, wherein,
when the first region and the second region are a same regions respectively in the target image and the reference image, the weight value is set as a first weight value,
when the first region and the second region are adjacent regions respectively in the target image and the reference image, the weight value is set as a second weight value, and
when the first region and the second region are neither the same regions nor adjacent regions respectively in the target image and the reference image, the weight value is set as another weight value other than the first weight value and the second weight value,
wherein the first weight value is smaller than the second weight value, and the weight value is larger when the first region in the target image is far from the second region in the reference image.

10. The device according to claim 9, wherein the target image is a target lung tomographic image to be recognized, the reference image is a sample lung tomographic image in a database, the feature points are pixels in a diseased region in the lung tomographic image, and the reference point is a body center point.

11. The device according to claim 10, wherein the region divider is further configured to determine the body center point based on body bony structures by:
extracting the bony structures from the target lung tomographic image;
determining an isolated region with a largest area as a spine;
determining a central column of the spine and an upper edge of the spine;
determining the bony structure within an upper region above the upper edge of the spine, with left and right boundaries of the upper region being respective left and right boundaries of the spine;
determining a lower edge of the bony structure determined in the upper region; and
determining a midpoint of the central column between the upper edge and the lower edge as the body center point.

12. The device according to claim 11, wherein the region divider is further configured to divide the target lung tomographic image into a region around the body center, an inner-wall region in lung and a middle region in lung based on positions of pixels in the target lung tomographic image relative to the body center point.

13. The device according to claim 12, wherein the region divider is further configured to divide the lung tomographic image by:
determining an overlapped region between a circular region and a lung region as the region around the body center, with the circular region having a predetermined radius and using the body center point as a circle center;
determining the inner-wall region in lung by:
creating a straight line for connecting the body center point with a center of the lung region;
determining an upper tangent line and a lower tangent line which are parallel to the straight line and tangent to a contour of the lung region, and determining an edge contour of the lung region between an upper tangent point corresponding to the upper tangent line and a lower tangent point corresponding to the lower tangent line; and
moving the edge contour towards the body center point along normal vectors of contour points by a predetermined distance, and determining a region surrounded by the moved edge contour and an original edge contour as the inner-wall region in lung; and
obtaining the middle region in lung by subtracting the region around the body center and the inner-wall region in the lung from the lung region.

14. The device according to claim 10, further including a target lung region recognizer configured to:
extract a normal lung region from the target lung tomographic image;
extracting a diffuse diseased region and a solid diseased region;

obtaining a lung region by combining the normal lung region, the diffuse diseased region and the solid diseased region; and using the target lung region as the target image for region dividing.

15. The device according to claim 14, wherein the lung region recognizer is further configured to: extract the normal lung region with a threshold segmentation method.

16. A non-transitory computer readable medium storing a method for determining image similarity, the method controlling a computer according to claim 1.

* * * * *